United States Patent
Chandler et al.

(10) Patent No.: US 8,756,926 B2
(45) Date of Patent: Jun. 24, 2014

(54) EXHAUST SYSTEM FOR A LEAN BURN IC ENGINE

(75) Inventors: Guy Richard Chandler, Cambridge (GB); Neil Robert Collins, Royston (GB); Paul Richard Phillips, Royston (GB); Daniel Swallow, Sandy (GB)

(73) Assignee: Johnson Matthey Public Limited Company, London (GB)

( * ) Notice: Subject to any disclaimer, the term of this patent is extended or adjusted under 35 U.S.C. 154(b) by 464 days.

(21) Appl. No.: 13/003,433

(22) PCT Filed: Jul. 6, 2009

(86) PCT No.: PCT/GB2009/050794
§ 371 (c)(1),
(2), (4) Date: Apr. 13, 2011

(87) PCT Pub. No.: WO2010/004320
PCT Pub. Date: Jan. 14, 2010

(65) Prior Publication Data
US 2011/0179777 A1    Jul. 28, 2011

(30) Foreign Application Priority Data
Jul. 9, 2008 (GB) .................................. 0812544.5

(51) Int. Cl.
| | | |
|---|---|---|
| *F01N 3/00* | (2006.01) | |
| *F01N 3/10* | (2006.01) | |
| *B01D 53/56* | (2006.01) | |
| *B01D 53/86* | (2006.01) | |
| *B01J 8/00* | (2006.01) | |
| *C01B 21/00* | (2006.01) | |

(52) U.S. Cl.
USPC .............................. 60/301; 60/297; 423/239.1

(58) Field of Classification Search
USPC .................. 60/297, 301, 311, 295; 423/239.1
See application file for complete search history.

(56) References Cited

U.S. PATENT DOCUMENTS

| | | |
|---|---|---|
| 5,473,887 A | 12/1995 | Takeshima et al. |
| 6,696,031 B1 | 2/2004 | Twigg et al. |
| 7,062,904 B1 | 6/2006 | Hu et al. |
| 2004/0175315 A1 | 9/2004 | Brisley et al. |
| 2005/0129601 A1 | 6/2005 | Li et al. |
| 2006/0096276 A1* | 5/2006 | Goralski et al. ................ 60/286 |
| 2006/0120937 A1 | 6/2006 | Zuberi |
| 2007/0110650 A1 | 5/2007 | Pfeifer et al. |
| 2009/0087367 A1* | 4/2009 | Liu et al. ....................... 423/237 |

FOREIGN PATENT DOCUMENTS

| | | | |
|---|---|---|---|
| DE | 10 2005 005 663 A1 | 8/2006 | |
| EP | 1 057 519 A1 | 12/2000 | |
| EP | 1 064 094 B1 | 1/2001 | |
| GB | 2 457 651 A | 8/2009 | |
| WO | WO-01/12320 A1 | 2/2001 | |
| WO | WO-01/80978 A1 | 11/2001 | |
| WO | WO-02/068099 A1 | 9/2002 | |
| WO | WO-2004/022935 A1 | 3/2004 | |
| WO | WO 2008075111 A1 * | 6/2008 | ............... F01N 3/08 |

* cited by examiner

*Primary Examiner* — Audrey K Bradley
(74) *Attorney, Agent, or Firm* — Jimmie D. Johnson, Jr.

(57) ABSTRACT

An exhaust system (10) for a lean-burn internal combustion engine (12) comprises a first substrate monolith (16) comprising a catalyst for oxidizing nitric oxide (NO) comprising a catalytic oxidation component followed downstream by a second substrate monolith (18) which is a wall-flow filter having inlet channels and outlet channels, wherein the inlet channels comprise a NO x absorber catalyst (20) and the outlet channels comprise a catalyst for selective catalytic reduction (22) of nitrogen oxides with nitrogenous reductant.

16 Claims, 4 Drawing Sheets

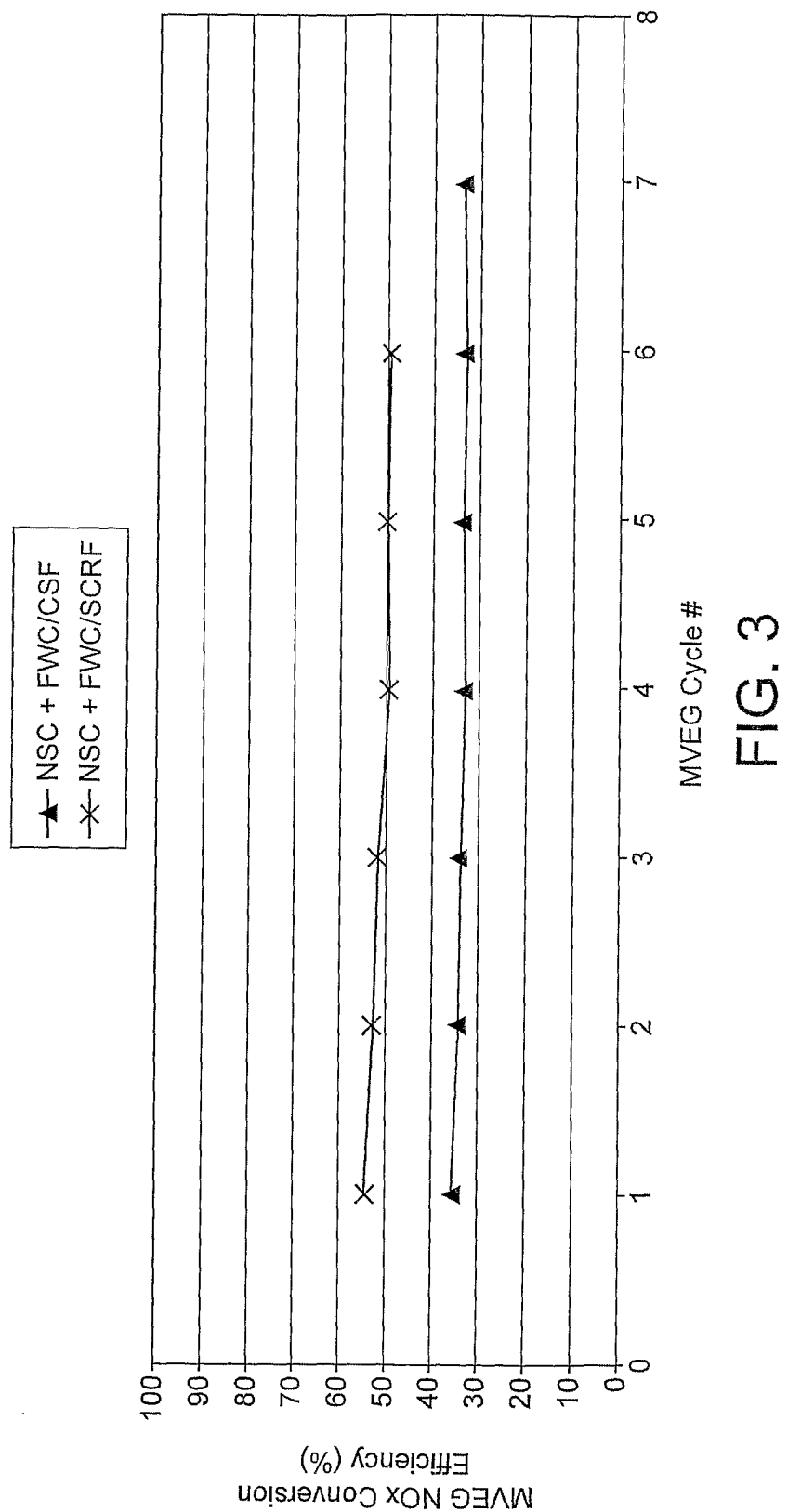

US 8,756,926 B2

EXHAUST SYSTEM FOR A LEAN BURN IC ENGINE

CROSS-REFERENCE TO RELATED APPLICATIONS

This application is the U.S. National Phase application of PCT International Application No. PCT/GB2009/050794, filed Jul. 6, 2009, and claims priority of British Patent Application No. 0812544.5, filed Jul. 9, 2008, the disclosures of both of which are incorporated herein by reference in their entirety for all purposes.

FIELD OF THE INVENTION

The present invention relates to an exhaust system for a lean-burn internal combustion engine, more especially for diesel (compression ignition) engine, which system comprising a $NO_x$ absorber catalyst (NAC) and a catalyst for selective catalytic reduction (SCR) of nitrogen oxides ($NO_x$) using a nitrogenous reductant.

BACKGROUND OF THE INVENTION

NOx absorber catalyst (NAC) are known e.g. from U.S. Pat. No. 5,473,887 (the entire contents of which is incorporated herein by reference) and are designed to adsorb nitrogen oxides ($NO_x$) from lean exhaust gas (lambda>1) and to desorb the $NO_x$ when the oxygen concentration in the exhaust gas is decreased. Desorbed $NO_x$ may be reduced to $N_2$ with a suitable reductant, e.g. diesel fuel, promoted by a catalyst component, such as rhodium, of the NAC itself or located downstream of the NAC. In practice, the oxygen concentration is adjusted to a desired redox composition intermittently in response to a calculated remaining $NO_x$ absorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold. More sophisticated common rail fuel injector systems in diesel engines can be used to meter very precise quantities of fuel to adjust exhaust gas composition.

A typical NAC formulation includes a catalytic oxidation component, such as platinum, a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \qquad (1);$$

and $$BaO + NO_2 + \tfrac{1}{2}O_2 \rightarrow Ba(NO_3)_2 \qquad (2),$$

wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

$$Ba(NO_3)_2 \rightarrow BaO + 2NO + 3/2 O_2 \text{ or } Ba(NO_3)_2 \rightarrow BaO + 2NO_2 + 1/2 O_2 \qquad (3);$$

and $$NO + CO \rightarrow \tfrac{1}{2}N_2 + CO_2 \text{ (and other reactions)} \qquad (4).$$

In the reactions of (1)-(4) above, the reactive barium species is given as the oxide. However, it is understood that in the presence of air most of the barium is in the form of the carbonate or possibly the hydroxide. The skilled person can adapt the above reaction schemes accordingly for species of barium other than the oxide. Equally, the skilled person can adapt the reaction scheme for $NO_x$ absorber components other than barium, eg. other alkaline earth metals or alkali metals.

Increasing concern about the environment, and increasing fuel prices, has led to the introduction of ever larger numbers of diesel engines for motor cars and light commercial vehicles. The emission control regulations now include strict control of "soot" or particulate matter ("PM"), as well as CO, hydrocarbons ("HC") and NOx. For control of PM, it has become clear that a filter or trap is required to remove PM from the flowing exhaust gases. One form of filter is commonly known as a wall-flow filter, whose construction is well known to the skilled person.

Practical wall flow filters are generally catalysed, usually with a catalyst to reduce PM combustion temperature and/or an oxidation catalyst capable of catalysing the conversion of NO in the exhaust gas to $NO_2$, for the $NO_2$/PM reaction.

WO 01/12320 discloses a wall-flow filter for an exhaust system of a combustion engine comprising: an oxidation catalyst containing e.g. a platinum group metal on a substantially gas impermeable zone at an upstream end of open upstream channels; and a gas permeable filter zone downstream of the oxidation catalyst for trapping soot. The downstream channels of the filter can include a $NO_x$ absorber catalyst (NAC) and optionally a Selective Catalytic Reduction (SCR) catalyst downstream of the NAC.

WO 2004/022935 discloses an exhaust system for a lean-burn internal combustion engine comprises a nitrogen oxide ($NO_x$) absorbent, a catalyst for catalysing the selective catalytic reduction (SCR) of $NO_x$ with a $NO_x$ specific reactant e.g. ammonia, first means for introducing a $NO_x$ specific reactant or a precursor thereof, e.g. urea, into an exhaust gas upstream of the SCR catalyst and means for controlling the introduction of the $NO_x$-specific reactant or the precursor thereof into the exhaust gas via the first introducing means, wherein the SCR catalyst is disposed upstream of the $NO_x$ absorbent and optionally with the $NO_x$ absorbent, and wherein the control means is arranged to introduce the $NO_x$-specific reactant or the precursor thereof to exhaust gas via the first introducing means only when the SCR catalyst is active, whereby exhaustion of $NO_x$-specific reactant to atmosphere is substantially prevented.

U.S. Pat. No. 7,062,904 discloses a filter coated with a $NO_x$ adsorber/catalyst on inlet sides of filter elements and SCR catalyst on the outlet sides of the filter elements. The adsorber/catalyst preferably enriches the ratio of $NO_2$ to NO in the $NO_x$ it does not adsorb. It is clear from the description that the catalyst can be combined with the $NO_x$ adsorber or it can be separate from and upstream of the $NO_x$ adsorber: it cannot be both combined with the $NO_x$ adsorber and located upstream of the $NO_x$ adsorber.

DE 10 2005 005 663A1 discloses that a wall-flow filter may carry a NOx trap, or NOx absorption catalyst (NAC), coating on the inlet cells, and an SCR catalyst coating on the exit cells. It is not clear that this design has ever been commercialised.

A problem with the wall-flow filter disclosed in DE 10 2005 005 663 A1 is that it can lead to increased emissions of ammonia following NAC regeneration events and is poor at treating cold-start emissions e.g. from cold-start from the first ECE cycle of the New European Drive Cycle (NEDC).

SUMMARY OF THE INVENTION

We have now developed a compact four-way conversion system, i.e. capable of treating hydrocarbons, carbon monoxide, particulate matter and nitrogen oxides, that reduces or overcomes problems associated with the prior art.

According to a first aspect, the invention provides an exhaust system for a lean-burn internal combustion engine, which system comprising a first substrate monolith comprising a catalyst for oxidising nitric oxide (NO) followed downstream by a second substrate monolith which is a wall-flow filter having inlet channels and outlet channels, wherein the inlet channels comprise a $NO_x$ absorber catalyst (NAC) comprising a catalytic oxidation component and the outlet channels comprise a catalyst for selective catalytic reduction (SCR) of nitrogen oxides ($NO_x$) with nitrogenous reductant.

By combining a NAC comprising a catalytic oxidation component and SCR components on the wall-flow filter, optionally together with a clean-up catalyst as described hereinbelow, the system as a whole treats HC, CO, PM and $NO_x$ more efficiently than prior art systems. We believe that one reason for this is that exotherm generated on the NAC function is able to maintain the wall-flow filter at a higher temperature than systems where the NAC is on a separate substrate monolith disposed upstream from the wall-flow filter. A benefit of this effect is that passive PM conversion in $NO_2$ is promoted by the higher temperature and active PM combustion is at less of a fuel penalty since less energy is needed to increase the wall-flow filter to temperatures necessary for PM combustion in oxygen. It also benefits $NO_x$ conversion overall since, once up to temperature, the NAC and SCR catalyst on the wall-flow filter can be maintained in a temperature window for favourable $NO_x$ conversion activity, i.e. the relatively high thermal capacity of the wall-flow filter can smooth out extremes of temperature in the exhaust system. This is a particular benefit for light-duty diesel engine vehicles where the exhaust gas temperature may fluctuate throughout a drive cycle, particularly in the ECE and in real world driving conditions, typically fuel supply to the engine is cut when the driver lifts his or her foot from the accelerator, reducing exhaust gas temperature.

In practice, the NAC is regenerated by contacting it intermittently with enriched exhaust gas generated by engine management means and/or by introducing a reductant into the exhaust gas downstream of the engine. Such enrichment, promotes desorption of adsorbed $NO_x$ and reduction of $NO_x$ on reduction catalyst present, such as rhodium or palladium. However, the enriched exhaust gas also generates ammonia ($NH_3$) from $NO_x$ on the oxidation catalyst component of the NAC, which $NH_3$ becomes adsorbed on the SCR catalyst downstream and is available for $NO_x$ reduction of $NO_x$ that slips past the NAC in lean exhaust gas conditions.

In one embodiment, the inlet channels of the wall-flow filter comprise a SCR catalyst disposed downstream of the NAC. The SCR catalyst can be present as a separate coating on the wall-flow filter or the SCR catalyst can be integral with the wall-flow filter, e.g. either the SCR catalyst can be impregnated as a salt solution into the material of a virgin wall-flow filter, or an SCR catalyst can be combined with ingredients that form a structure of the substrate monolith that is then extruded into a flow-through monolith and, following drying and calcination, alternate ends of the channels are blocked in a chequer board pattern arrangement at one end of the substrate monolith and unblocked channels are alternately blocked at the opposite end thereof in a similar arrangement. This latter arrangement requires that the porosity of the extrudate following drying and calcination is sufficient to function as a wall-flow filter, i.e. the porosity of the substrate monolith is at least 40%, such as at least 45%, e.g. 50% or at least 55% or up to 70%. A wall-flow filter derived from a SCR flow-through substrate of extruded type is described in our UK patent application no. 0801161.1, filed $23^{rd}$ Jan. 2008 and entitled "Catalysed Filter".

In the case of coatings, not every inlet cell need be so coated, but it is presently preferred to coat each cell. The geometric proportion of each coating is conveniently about 50:50, but other proportions may be used. Other catalyst functionalities may be incorporated if required on either or both of the inlet cells and the exit cells. In particular, as described hereinbelow, a clean-up catalyst, such as a relatively low-loaded platinum on alumina catalyst e.g. <5 $g/ft^3$ Pt, may be coated on the exit cells of the filter, or on a separate substrate disposed downstream of the filter.

Suitable coating formulations, typically referred to as "washcoats", are designed to avoid or reduce pore blockage either at the wall surface or interconnecting between pores within wall structure. As a result, catalyst, e.g. SCR catalyst, introduced into the channels from one end of a wall-flow filter using zone-coating techniques available to those skilled in the art (see for example EP 1064094), may move through the pore structure of the filter to sit within pores of the wall structure or even to emerge at the surface of the channels of the opposite "end" of the wall flow filter. It follows that by adopting appropriate washcoat formulations it is possible to zone-coat downstream ends of, say, channels intended for the inlet filter side, with SCR catalyst by introducing the SCR catalyst washcoat into the wall-flow filter from the downstream filter side, i.e. the opposite end of the wall-flow filter. Subsequently, the NAC coating can be applied to the upstream section of the inlet cells. There may, or may not, be an overlap of the coatings. If there is any overlap, the NAC coating overlaps the SCR coating.

BRIEF DESCRIPTION OF THE DRAWINGS

In order that the invention may be more fully understood, reference is made to the accompanying drawings, in which:

FIG. 3 is graph showing the $NO_x$ conversion achieved over repeated ECE cycles of the NEDC cycle for a system according to the first aspect of the invention fitted to a light-duty diesel vehicle run on a rolling road engine dynamometer, wherein the NO oxidation catalyst is a NAC (labelled "NSC" or "$NO_x$ sorber catalyst" in the Figure) vs. a similar system wherein the SCR catalyst on the wall-flow filter is exchanged for a regular catalysed soot filter catalyst at <10 $g/ft^3$ Pt/Pd;

DETAILED DESCRIPTION OF THE INVENTION

Figure 1:
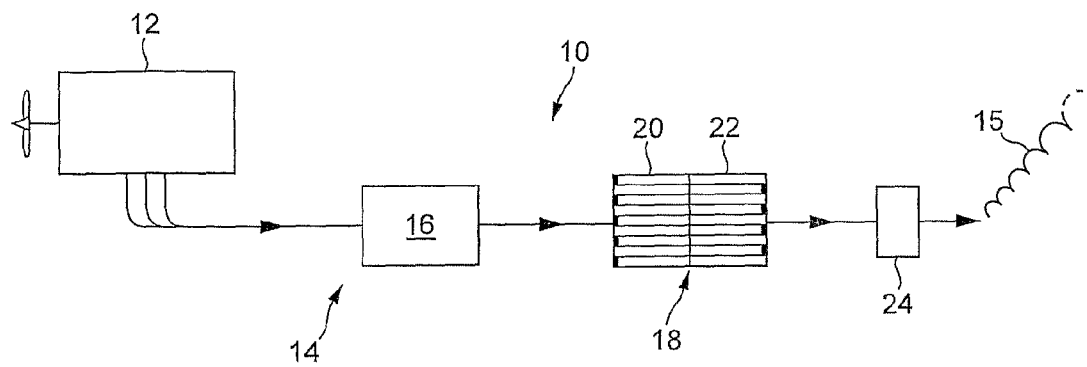
FIG. 1 is a schematic diagram showing an exhaust system according to the first aspect of the invention.

According to embodiments, the wall-flow filter comprises a length extending from an inlet end to an outlet end, wherein the NAC is located in a first zone of substantially uniform length from 30-70% of the wall-flow filter length with an upstream zone end defined by the wall-flow filter inlet end. The SCR catalyst may be located in a second zone of substantially uniform length from 30-70% of the wall-flow filter length with a downstream end defined by the wall-flow filter outlet end and the first zone and the second zone can overlap.

In an alternative embodiment, the NAC and the SCR catalyst are combined in the same catalyst as described in our WO 02/068099.

The wall-flow filter can have any suitable cell density dependent upon the application of use. Typical cell densities for use in a diesel exhaust system are from 100-400 cells per square inch. The wall-flow filter itself can be made of any suitable material, such as cordierite, silicon carbide or aluminium titanate etc.

In one embodiment, the NO oxidation catalyst is an oxidation catalyst, e.g. containing platinum or both platinum and palladium supported on a suitable refractory oxide support. Alternatively, it can be a NAC. Desirably, such NO oxidation catalyst component is mounted close to the engine, for example in the exhaust manifold, or between the exhaust manifold and a turbocharger. The wall-flow filter can be located immediately downstream of the NO oxidation catalyst e.g. in the same can or casing, or the wall-flow filter can be located further downstream e.g. in an underfloor location on a vehicle. In the case of an oxidation catalyst, NO oxidation is sufficient to assist in passive PM combustion on the filter. Both the oxidation catalyst and the NAC embodiments of the NO oxidation catalyst contribute to improving overall HC and CO conversion, which may otherwise interfere with $NO_x$ storage in the filter, and also convert NO to $NO_2$ and for more efficient adsorption of the $NO_x$ as nitrate on the NAC on the filter. It can be seen by comparing FIGS. 4A and B that a majority of $NH_3$ for $NO_x$ reduction using the SCR is generated on the upstream NAC.

A further benefit of the upstream NO oxidation catalyst is to improve cold-start pollutant conversion, e.g. over the MVEG-A cycle (or New European Driving Cycle (NEDC)), because the wall-flow filter generally has a higher thermal capacity than the first substrate monolith. In addition to locating the first substrate monolith closer to the engine to maximise heat transfer, the thermal capacity of the first substrate monolith can also be selected to achieve rapid light off of the NO oxidation catalyst, e.g. using a metal monolith or a smaller substrate to improve heat transfer.

Additionally, the use of an upstream NO oxidation catalyst helps improve active filter regeneration control at relatively high temperature, because a thermocouple located between the NO oxidation catalyst and the filter can be used to ensure that the correct conditions are met; inadequate control can cause the filter to over-temperature causing excessive thermal ageing and consequent loss of catalyst activity over time.

The first substrate monolith can be a flow-through substrate monolith or a partial filter, such as those disclosed in EP 1057519 or WO 01/080978.

In a preferred embodiment, the outlet channels of the wall-flow filter comprise a catalyst for converting ammonia and/or hydrocarbons and carbon monoxide. This has the advantage that ammonia slip or hydrocarbon or carbon monoxide emissions during lean operation or during active or passive filter regeneration can be converted. In one embodiment, the clean-up catalyst is located in a zone of substantially uniform length defined at a downstream end by a wall-flow filter outlet end. Alternatively, the clean-up catalyst can be disposed in a separate layer overlying the SCR catalyst.

In a particular embodiment, the SCR catalyst is located in a second zone of substantially uniform length from 30-65% of the wall-flow filter length with an upstream end of the second zone defined by a downstream end of the first zone and the clean-up catalyst is disposed in a third zone of substantially uniform length from 5-40% of the wall-flow filter length with an upstream end of the third zone defined by a downstream end of the second zone and at a downstream end by the outlet end of the wall-flow filter.

In embodiments, the clean-up catalyst for use in the present invention is a relatively low-loaded platinum on alumina catalyst.

The NAC catalyst for use in the present invention can be selected from the group consisting of at least one alkaline earth metal, alkali metal and rare earth metal, each of which is optionally supported on a refractory oxide.

The SCR catalyst for use in the present invention can be selected from the group consisting of a transition metal/zeolite, and at least one of Cu, Hf, La, Au, In, V, lanthanides and Group VIII transition metals, such as Fe, supported on a refractory oxide. Suitable refractory oxides include $Al_2O_3$, $TiO_2$, $CeO_2$, $SiO_2$, $ZrO_2$ and mixed oxides containing two or more thereof. The non-zeolite catalyst can also include tungsten oxide.

According to a second aspect, there is provided a wall-flow filter having first channels and second channels, wherein the first channels comprise a $NO_x$ absorber catalyst (NAC) comprising a catalytic oxidation component and the second channels comprise a catalyst for selective catalytic reduction (SCR) of nitrogen oxides ($NO_x$) with a nitrogenous reductant and a clean-up catalyst for converting ammonia and/or hydrocarbons and carbon monoxide.

It will be appreciated that the wall-flow filter according to the second aspect of the invention is suitable for use in the first aspect according to the invention. Accordingly, features of the wall-flow filter discussed hereinabove in relation to the first aspect of the invention apply equally to the second aspect of the invention.

Preferably, the clean-up catalyst is located in a zone of substantially uniform length defined at one end by an inlet end of the channels comprising the SCR catalyst.

In a first embodiment, the clean-up catalyst is disposed in a separate layer overlying the SCR catalyst, wherein the SCR catalyst is present as a separate coating on the wall-flow filter or the SCR catalyst is integral to the wall-flow filter, e.g. either the SCR catalyst is impregnated as a salt solution into the material of a virgin wall-flow filter, or SCR catalyst is combined with ingredients that form a structure of the substrate monolith that is then extruded into a flow-through monolith and, following drying and calcination, alternate ends of the channels are blocked in a chequer board pattern arrangement at one end of the substrate monolith and unblocked channels are alternately blocked at the opposite end thereof in a similar arrangement.

According to a second embodiment of the second aspect of the invention, the wall-flow filter comprises a length extending from a first end to a second end, wherein the NAC is located in a first zone of substantially uniform length from 30-70% of the wall-flow filter length with an upstream zone end defined by the first end of the wall-flow filter, the SCR catalyst is located in a second zone of substantially uniform length from 30-65% of the wall-flow filter length with an upstream end of the second zone defined by a downstream end of the first zone and the clean-up catalyst is disposed in a third zone of substantially uniform length from 5-40% of the wall-flow filter length with an upstream end of the third zone defined by a downstream end of the second zone and at a downstream end by the second end of the wall-flow filter.

The exhaust system can be used to treat emissions from a lean-burn internal combustion engine, particularly of a vehicle, including lean-burn gasoline and diesel applications, such as light-duty diesel (as defined by the relevant legislation) vehicles.

In FIG. 1 is shown an apparatus 10 comprising a light-duty diesel engine 12 and an exhaust system 14 comprising a conduit for conveying exhaust gas emitted from the engine to atmosphere 15 disposed in which conduit is a metal substrate monolith coated with a NAC 16 followed in the flow direction by a silicon carbide wall-flow filter 18. The inlet channels of the wall-flow filter are coated from an inlet end with a NAC composition 20 to about 50% of the total length of the wall-flow filter, and the remaining 50% of the total length thereof is coated with a SCR catalyst 22 from the outlet end. A clean-up catalyst 24 comprising a relatively low loading of Pt on alumina is disposed downstream of wall-flow filter 18.

Figure 2:
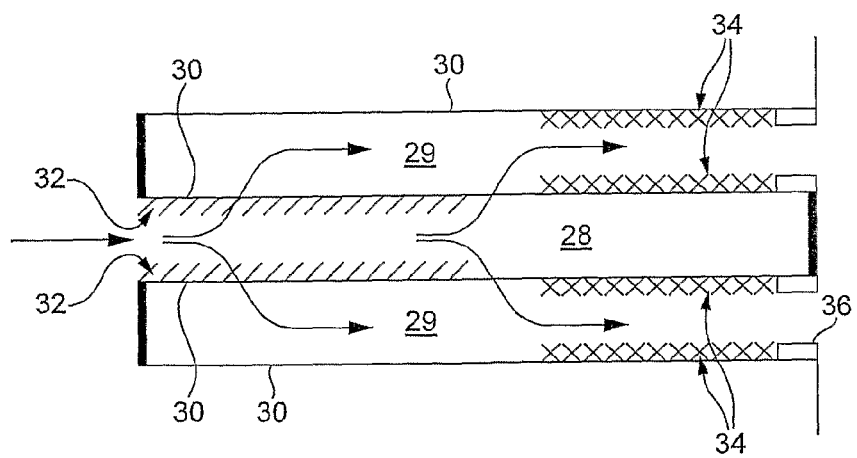
FIG. 2 is a schematic diagram showing a wall-flow filter according to the second aspect of the invention.

FIG. 2 shows, for the sake of simplicity, a single inlet channel 28 and adjacent outlet channels 29, in a conventional ceramic wall-flow filter. The gas permeable walls of the channels are indicated by 30 and the intended direction of gas flow is indicated by the arrows. Deposited on the inlet end of the inlet channel 30 is a NAC coating 32 and a SCR catalyst 34 is shown deposited in the outlet channels 29. A clean-up catalyst coating 36 is shown extending from the extreme outlet end of the outlet channels 29 to meet with the SCR catalyst coating 34.

FIG. 3 shows a graph plotting MVEG (ECE) cycle number vs. $NO_x$ conversion efficiency for two systems, the first labelled "NSC+FWC/CSF" is a comparator system, wherein a NAC catalyst (or "$NO_x$ sorber catalyst" (NSC)) is followed by a wall-flow filter coated to 50% of total length from the inlet end with NAC (denoted "FWC" or "four way catalyst") and 50% of the outlet channels from the outlet end is coated with a regular relatively low loading catalysed soot filter (CSF) composition (<10 gft$^{-3}$ Pt/Pd on alumina-based refractory support). The system according to the invention is identical except in that the CSF is replaced with a filter comprising a SCR catalyst coating (denoted "SCRF"). The system is fitted to a Euro IV light-duty diesel-engined passenger vehicle configured to regenerate NAC intermittently according to pre-programmed original equipment manufacturer specification. The vehicle was run repeatedly over the ECE part of the EUDC (MVEG-A) emissions cycle using a rolling road engine dynamometer. The improvement in $NO_x$ conversion efficiency is evident from FIG. 3.

Figure 4A:
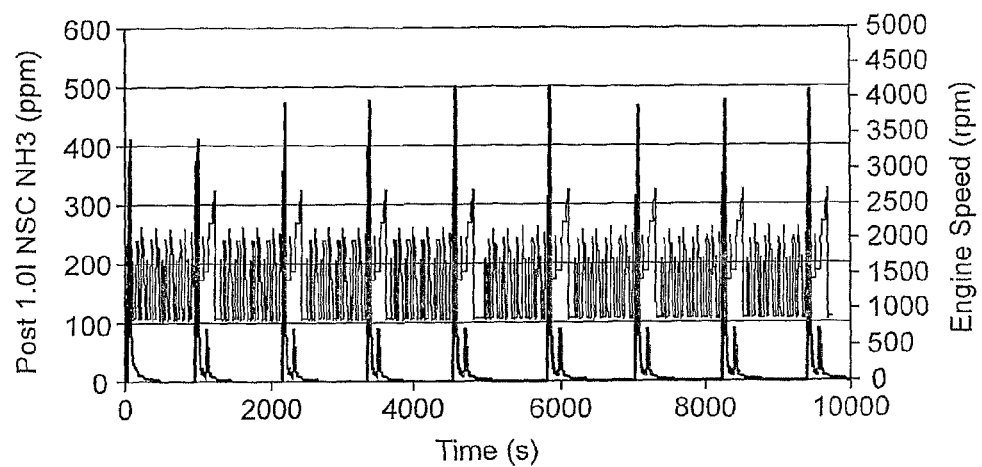
FIGS. 4A and 4B are graphs showing $NH_3$ present in exhaust gas between the NAC and the wall-flow filter (FIG. 4A) in the comparator system from FIG. 3 downstream of the wall-flow filter (FIG. 4B)
Figure 4B:
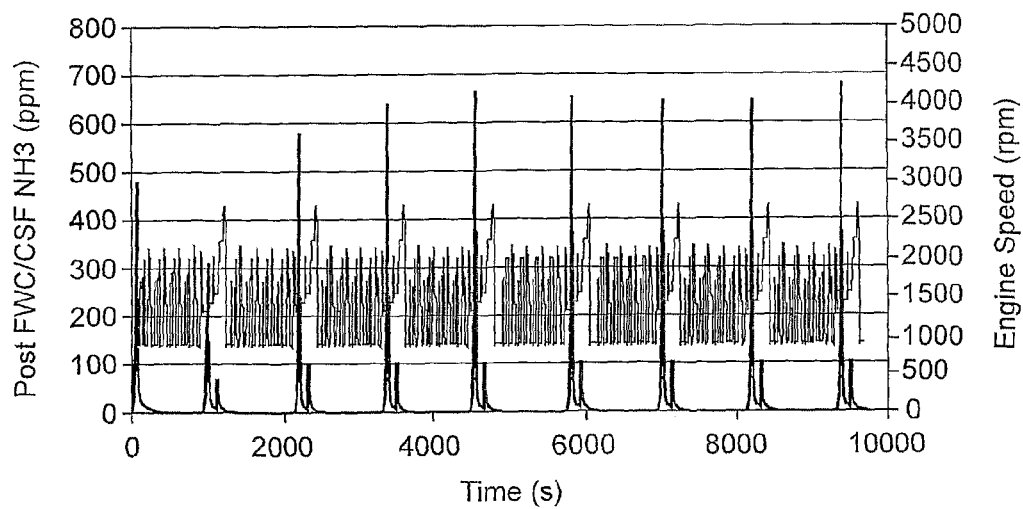

FIGS. 4A and 4B are graphs showing the amount of ammonia present in exhaust gas tested at two locations in the exhaust system of the comparator system described in connection with FIG. 3 hereinabove. The first test location was between the upstream NAC and the wall-flow filter (FIG. 4A) and the second test location was downstream of the wall-flow filter, i.e. downstream of the CSF outlet zone. It can be seen from FIG. 4A that a quantity of ammonia is generated during the intermittent NAC regeneration events. However, from FIG. 4B it can be seen that a similar quantity of ammonia is present. We interpret these results to indicate that a majority of ammonia is generated on the upstream NAC, because the Pt loading in the CSF zone is insufficient to generate significant quantities of $NH_3$.

Figure 5:
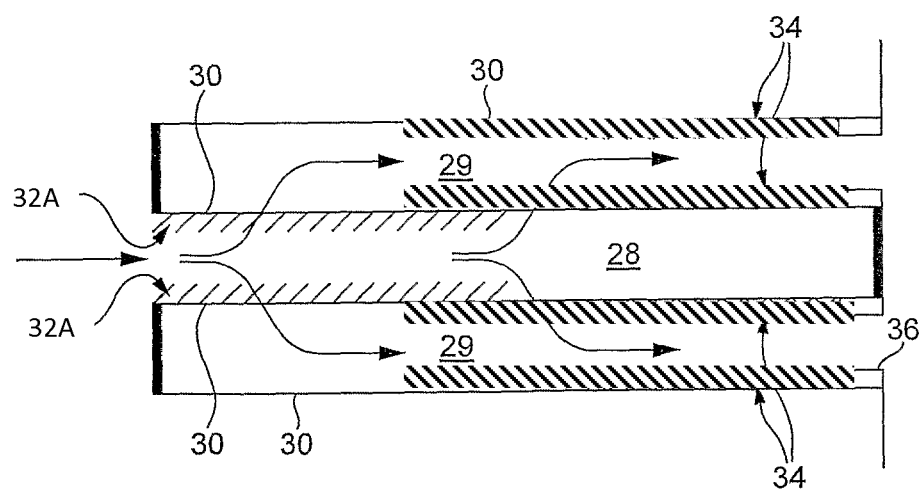
FIG. 5 is a schematic diagram showing an exhaust system according to another aspect of the invention.

FIG. 5 shows, for the sake of simplicity, a single inlet channel 28 and adjacent outlet channels 29, in a conventional ceramic wall-flow filter. The gas permeable walls of the channels are indicated by 30 and the intended direction of gas flow is indicated by the arrows. Deposited on the inlet end of the inlet channel 30 is a NAC coating and downstream SCR coating 32A and an overlapping second SCR catalyst 34 is shown deposited in the outlet channels 29 from the outlet end.

For the avoidance of doubt, the entire contents of all documents referenced herein are incorporated herein by reference.

The invention claimed is:

1. An exhaust system for a lean-burn internal combustion engine comprising a first substrate monolith comprising a first catalyst for oxidizing nitric oxide (NO) followed downstream by a second substrate monolith which is a wall-flow filter having inlet and outlet channels and an inlet and outlet end, wherein the inlet channels comprise a $NO_x$ absorber catalyst (NAC) comprising a catalytic oxidation component and the outlet channels comprise a first catalyst for selective catalytic reduction (SCR) of nitrogen oxides with a nitrogenous reductant, wherein the inlet channels of the wall-flow filter comprise a second SCR catalyst disposed downstream of the NAC.

2. An exhaust system according to claim 1, wherein the first and second SCR catalysts are the same composition and the wall flow filter is an extruded substrate comprising the first and second SCR catalysts.

3. An exhaust system according to claim 1, wherein the first SCR catalyst and the second SCR catalyst are the same catalyst composition.

4. An exhaust system according to claim 1, wherein the first substrate monolith is a flow-through substrate monolith.

5. An exhaust system according to claim 1, wherein the first substrate monolith is a partial filter.

6. An exhaust system according to claim 1, wherein the first catalyst for oxidizing NO is an NAC.

7. An exhaust system according to claim 1, wherein the NAC catalyst contains at least one alkaline earth metal, alkali metal and rare earth metal supported on a refractory oxide.

8. An exhaust system according to claim 1, wherein the first and second SCR catalysts are a transition metal/zeolite, a transition metal/refractory oxide, or V/tungsten oxide.

9. An exhaust system according to claim 1, wherein the first catalyst for oxidizing NO comprises a platinum supported on a refractory oxide.

10. An exhaust system according to claim 9, wherein the first catalyst for oxidizing NO further comprises palladium.

11. An exhaust system according to claim 1, wherein the outlet channels comprise a clean-up catalyst for converting ammonia and/or hydrocarbons and carbon monoxide.

12. An exhaust system according to claim 11, wherein the clean-up catalyst is disposed in a third zone of 5-40% of the length of the filter at the downstream end.

13. An exhaust system according to claim 11, wherein the clean-up catalyst comprises platinum on alumina.

14. An exhaust system according to claim 1, wherein the NAC is located in a first zone of 30-70% of the wall-flow filter length from the wall-flow filter inlet end.

15. An exhaust system according to claim 14, wherein the first SCR catalyst is located in a second zone of 30-70% of the wall-flow filter length from the wall-flow filter outlet end.

16. An exhaust system according to claim 15, wherein the first zone containing the NAC catalyst overlaps the second zone containing the first SCR catalyst.

* * * * *